Patented Sept. 14, 1926.

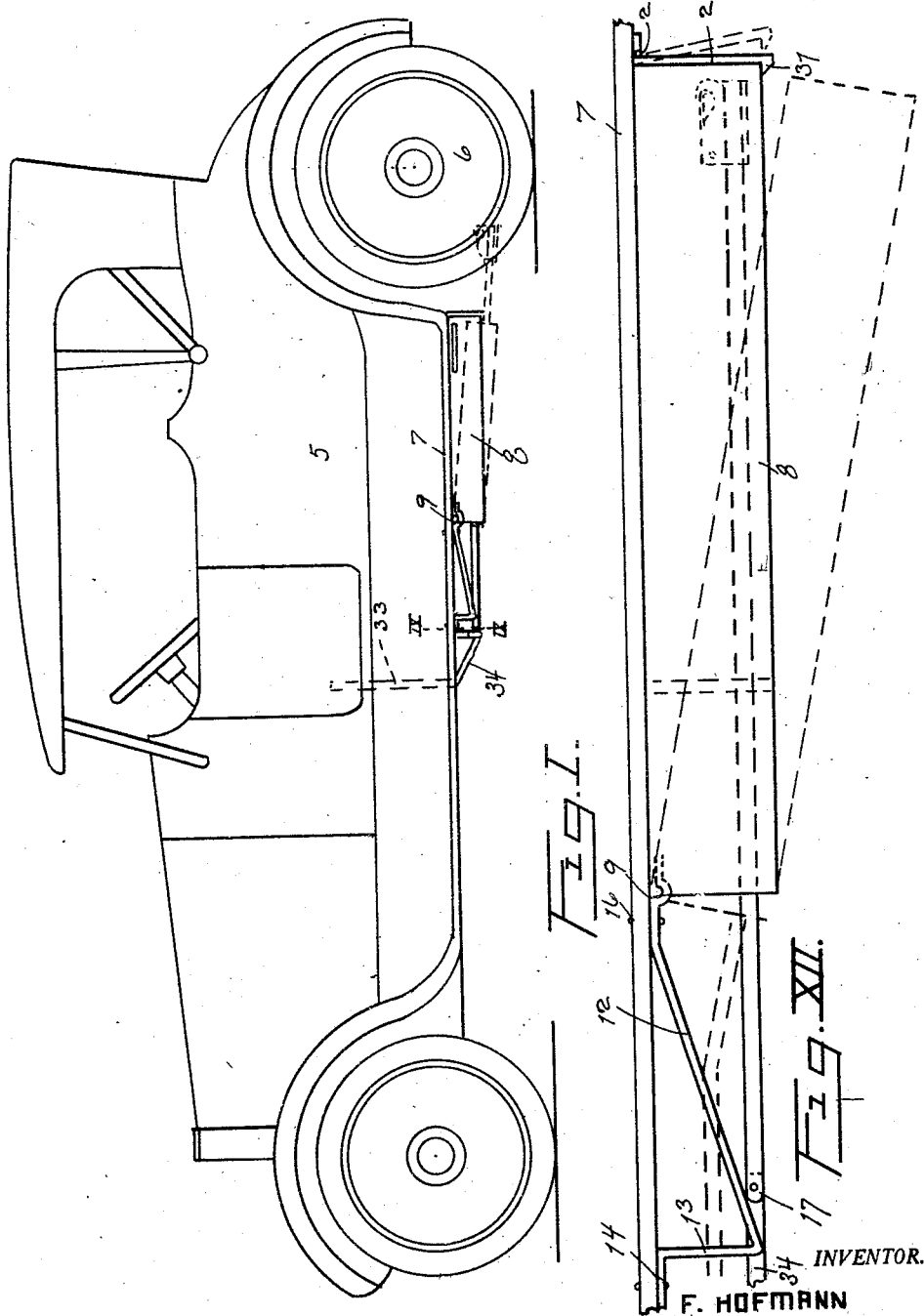

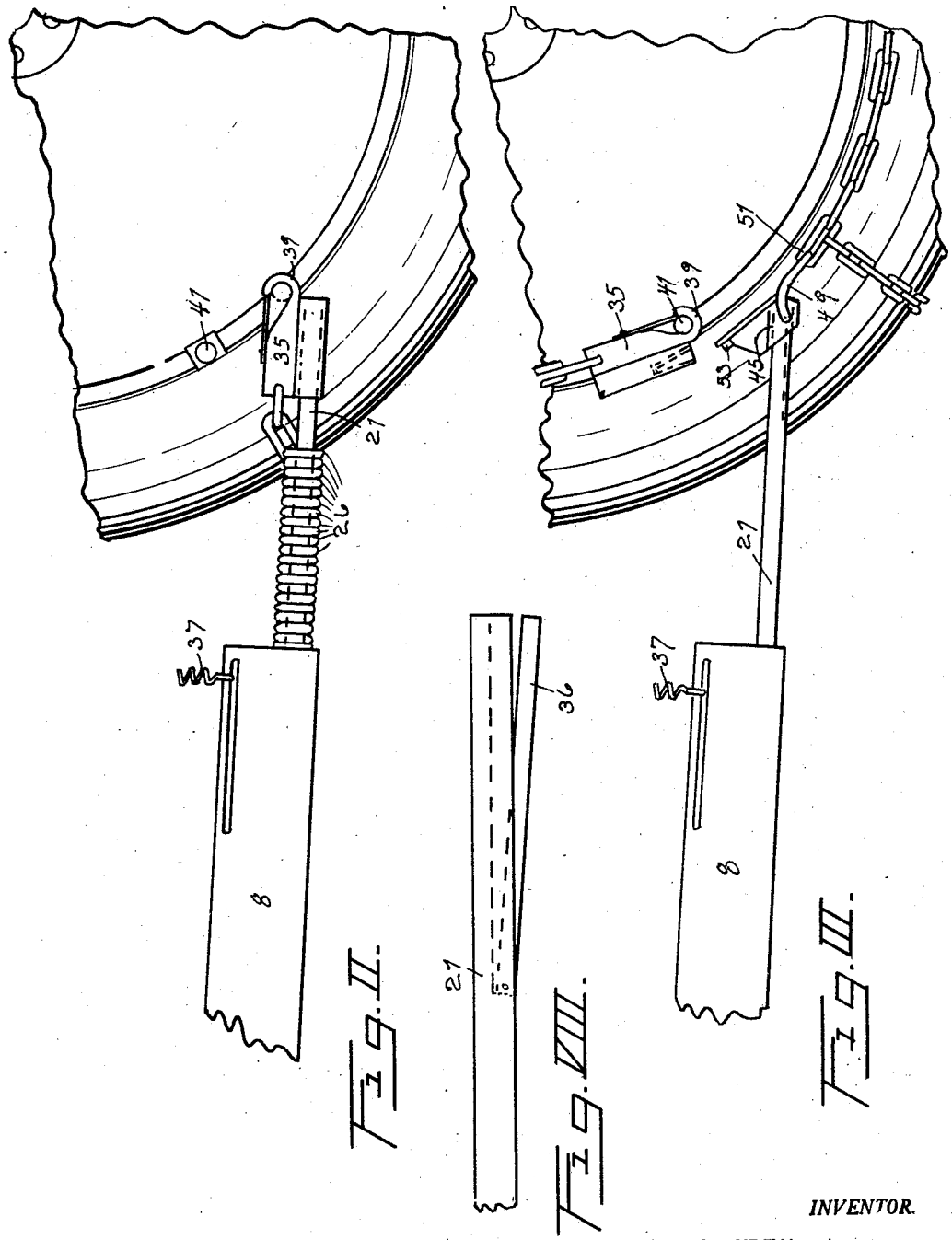

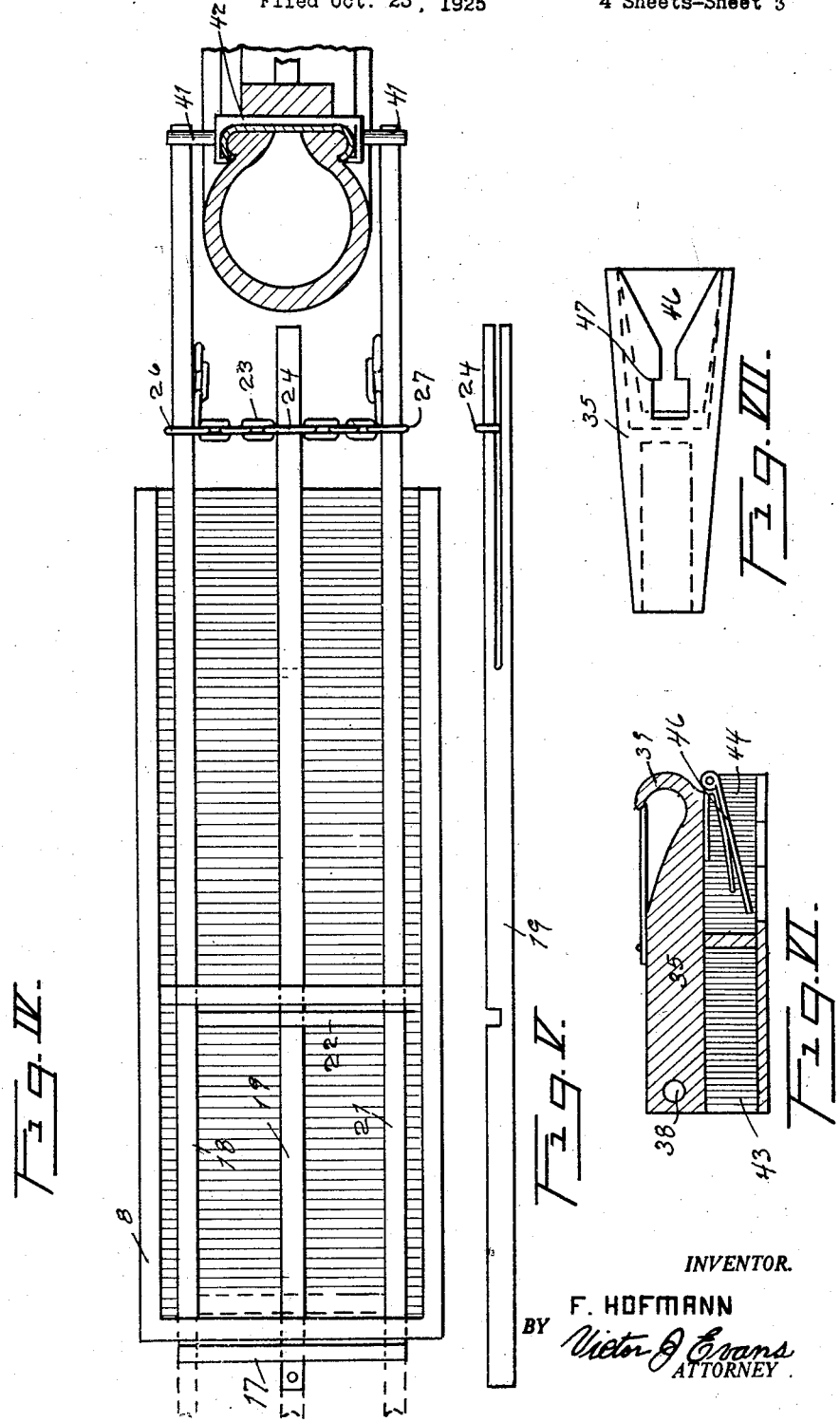

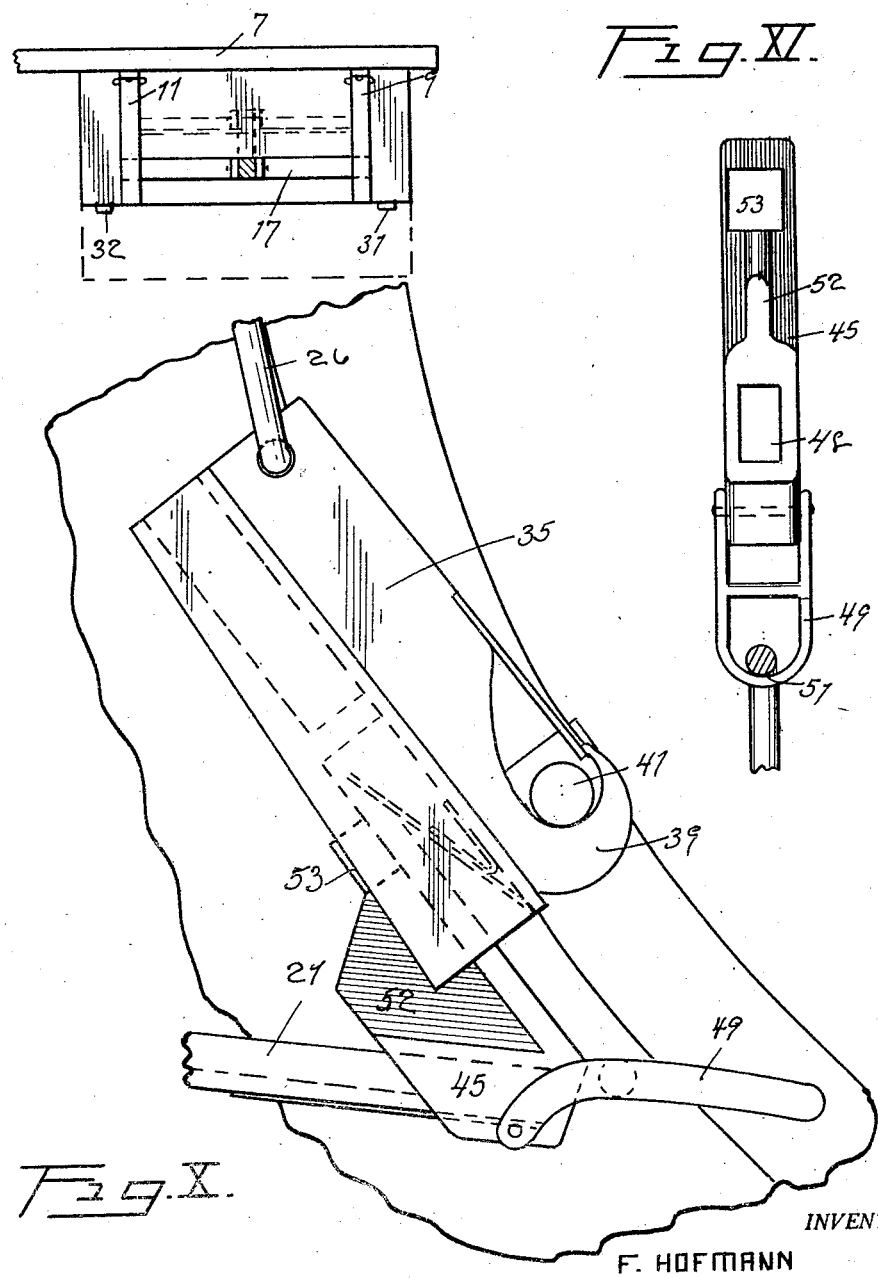

1,600,172

UNITED STATES PATENT OFFICE.

FRITZ HOFMANN, OF REPRESA, CALIFORNIA.

CHAIN-APPLYING DEVICE.

Application filed October 23, 1925. Serial No. 64,432.

This invention relates to improvements in chain applying devices and has particular reference to a device for automatically applying anti-skid chains to the rear wheels of an automobile.

The principal object of this invention is to produce a device of this character which is simple in construction and therefore efficient in use.

A further object is to provide a device which may be attached to any standard make of car without materially altering the construction of the same A still further object is to produce a device which will be neat in appearance when upon the car.

Other objects and advantages will be apparent during the course of the following description.

In the accompanying drawings forming a part of this specification and in which like numerals are employed to designate like parts throughout the same, Figure I is a side elevation of an automobile having my device attached thereto, Figure II is an enlarged fragmentary detail view showing the manner of engaging the chain to the rim, Figure III is a view similar to Figure II showing the chain applied to the tire and the abutting ends about to become engaged with each other.

Figure IV is an enlarged detail top plan view of the chain retaining box,

Figure V is a side elevation of one of the chain retaining members,

Figure VI is a vertical cross-section of one of the connecting links,

Figure VII is a bottom plan view of Figure VI,

Figure VIII is a side elevation of one the chain retaining members,

Figure IX is an end elevation of Figure IV,

Figure X is an enlarged detail view showing the chain connecting members in locked position, Figure XI is a plan view of one of the chain connecting members, and Figure XII is an enlarged detail side elevation of the chain retaining box.

It is a dirty job to place anti-skid chains upon the wheels of an automobile, and further it is often a difficult thing as well due to the cramped position a person has to work in.

I have therefore provided a simple device wherein by pressing upon a lever adjacent the driver's seat a forked arm is pushed rearwardly from a chain retaining box so that hooks carried upon the end of the chain engage pins upon each side of the rim thus drawing the chain off of the forked arms, carrying the same around the tire and eventually engaging the retaining links upon the opposite end of the chain.

In the accompanying drawings wherein for the purpose of illustration is shown a preferred embodiment of my invention, the numeral 5 designates an automobile as a whole having rear wheels 6 and a running board 7 to the under side of which is attached a chain retaining box 8. As the equipment on both sides of the car is identical, but one will be hereinafter described.

This box 8 is supported at its forward end by a pair of supports 9 and 11 and in such a manner that the box may be moved to its dotted line position of Figure I and II pivoting upon the supports 9 and 11. These supports are continued toward the front of the machine and in a downward direction as shown at 12, thence upwardly as shown at 13 and secured to the running board as shown at 14. It is to be understood that they are also secured to the running board at the point 16. This results in a pair of cams 12 being formed against which the cross bar 17 of the chain retaining fork is adapted to ride. This fork consists of three parallel bar members 18, 19 and 21 joined by the cross pieces 17 and by a similar cross piece 22.

It will be noted by viewing Figure IV that the bar 19 is shorter than the bars 18 and 21. The reason for this is obvious by viewing this figure.

By viewing Figure V it will be noted that the bar 19 is slotted. This is for the purpose of accommodating the center links of the cross chains. One of these cross chains is shown at 23 having its center link 24 upon the bar 19. The links 26 and 27 shown upon the bars 18 and 21 may be special links adapted to slide upon these bars or may simply be links which are parts of the anti-skid chain.

The chain box is held in the full line position of Figures I and XII as by a closure 28 hingedly supported as at 29 to the running board 7. This closure has a pair of hooked ends 31 and 32 adapted to engage the under surface of the box 8. An operating lever is shown at 33 which operating lever is connected to a link 34 extending to the opposite sides of the vehicle where it is in turn properly supported and connected to each of the chain retaining forks.

The members 18 and 21 each have a spring pressed bar 36 recessed in the free end thereof. The purpose of this bar is to act as a brake to prevent too rapid withdrawal of the chain and its associated parts therefrom. The rear end of the box 8 is preferably supported upon springs 37 but it is obvious that the same might be supported in any other convenient manner.

The structure thus far described completes the device for retaining the chain to be applied to the wheel. The chain is of ordinary construction with the exception that the customary connector links are removed and links of my own design are employed in place thereof.

Referring now to Figure VI, I have shown a connector link having an opening 38, to which the chain is attached. This connector link has a hooked end 39 adapted to engage a pin 41 extending from the side of the rim. This pin may be secured to the rim in any convenient manner, as by a clamp as shown at 42 (see Figure IV).

A connecting member 35 has an opening 43 formed therein so as to be slidably positioned on the bar 18 or 21, as the case may be. This member 35 is also provided with an opening 44 having a spring-pressed tongue 46 positioned therein. A slot is formed in one of the walls so as to form a latch-shaped opening 47 (see Figure VII). The connecting link adapted to be attached to the opposite end of the chain from the link just described, is best shown in Figures X and XI, and is designated as a whole by the numeral 45, and consists of a casting having an opening 48 therethrough. This opening permits the casting to be slidably positioned on the bar 21, and has a link 49 connected thereto and to which link the skid chain is secured as at 51 of Figure III. This casting 45 is provided with an upstanding web 52, which terminates in a squared head 53.

The result of this construction is that when the link 35 and 45 are brought into alignment as shown in Figure III, the web 52 will enter the slot 47 in such a manner that the head 53 will become locked in the slot 47 through the action of the spring tongue 46.

My device operates in the following manner:—

Assuming that one of the chain boxes has been placed upon the under side of each running-board and properly connected to their operating lever, they will lie in the full line position shown in Figure I. By now pushing forwardly upon the lever the action will be to move the cross bar 17 toward the rear wheel. This will first push the closure 28 away from the open end of the box 8 which will permit this end of the box to drop. Further pushing the cross piece 17 rearwardly will result in the same traveling. At the same time the parallel members 18, 19 and 21 will have moved outwardly until the ends are in the relative position shown in Figure II. At this time the members 35 which are positioned upon the bars 18 and 21 will be engaged by the pins 41 and withdrawn from these bars. The chain attached to these members 25 will be withdrawn from the bars 18 and 21 together with the cross links carried on the bar 19. By the time the wheel has made a complete revolution all of the chain will be carried upon the surface of the tire and the links 45 will be positioned upon the ends of the bars 18 and 21 in a position to engage the links 35.

As soon as the chains are entirely removed from the parallel bar members the same are withdrawn into the chain box with the result that the member 17 moving over the cam surface 12 will cause the chain box 8 to be elevated to its normal position.

It will thus be seen that with a device of this character, it is possible for me to apply a chain to the wheel of an automobile while the same is progressing over the highway.

It is to be understood that the form of my invention herewith shown is to be taken as a preferred example of the same and that various changes relative to the shape, size and arrangement of parts may be resorted to without departing from the spirit of the invention or the scope of the subjoined claims.

Having thus described my invention, I claim:—

1. In combination with an automobile having a running board and wheels positioned adjacent thereto, a chain carrying box pivotally supported beneath said running board, a forked member positioned within said running board, said forked member having a cross-piece engaging a pair of spaced cams positioned beneath said running board, said forked member being provided with a plurality of parallel bar members adapted to receive a skid chain thereon, links positioned on said chain, said links being adapted to engage pins positioned on said wheel, and a second pair of links adapted to engage said first mentioned links when said chain is engaging said wheel.

2. In a device of the character described, the combination with an automobile having a running board and a wheel in alignment therewith, a box pivotally secured beneath said running board, a chain carrying fork positioned in said box, means for ejecting a portion of said fork from said box, cam means engaging said fork for normally retaining said box in elevated position, a pin secured to said wheel and extending outwardly therefrom, a pair of connecting links secured to said chain, said links having a hooked extremity and adapted to engage said pins on said wheel, a second pair of connecting links secured to the opposite ends of said chain, said second mentioned links having a locking head adapted to be received in a recess formed in said first mentioned connecting links, as and for the purpose specified.

In testimony whereof I affix my signature.

FRITZ HOFMANN.